Patented Dec. 10, 1935

2,023,675

UNITED STATES PATENT OFFICE 2,023,675

FIBROUS COMPOSITION

Harry C. Fisher, Norwood, Ohio, assignor to The Richardson Company, Lockland, Ohio, a corporation of Ohio No Drawing. Application May 25, 1929,
Serial No. 366,105

12 Claims. (Cl. 106—31)

My invention provides compositions of fibers and binder substances in a new form, together with a process of making them, and it is based upon the discovery that with sufficient mechanical work, compositions of fiber and binder may be brought into association with a liquid vehicle to give a product susceptible of many uses in the arts.

An object of my invention is to provide a product in which plasticity is either produced or controlled or both, by the presence of a liquid vehicle which is not a solvent for the particular binder used.

A further object of my invention is to facilitate the handling of both hard and soft compositions at ordinary temperatures.

Still a further object of my invention is to provide a moulding composition from which useful articles may be formed without the use of such temperatures as will endanger the integrity of any of the ultimate ingredients thereof.

Still a further object of my invention is to increase the permissible time lag between the formation of a composition as such, and the fabrication of it into useful articles, so that the composition itself may be made and stored for long periods before use.

A specific object of my invention is to provide a composition of fibers and water-repellent binder with or without a non-fibrous filler, which is retained in a usable form through the use of water; but which will become as hard as the nature of the ingredients determines, upon the expelling of the water, and the amalgamating of the ingredient due to pressure with or without heat, depending upon the nature of the binder used.

Another specific object is the production of a composition which stays usable without the use of solvent, and which can be fabricated into a solid object without the disadvantages attending the use of compositions softened by solvent action.

Still a further object of my invention is the provision of a process for the manufacture of such compositions, which is inexpensive and positive.

These and other objects of my invention which will be pointed out hereinafter, or will be apparent upon reading these specifications, I accomplish in that product and by that process of which I shall describe an exemplary embodiment.

The embodiment which I shall describe has to do with asphalt as an example of a binder, and cotton as an example of a fiber; but it will be understood that other binders are equally as applicable to my invention, and that other fibers may be used. Thus the binders may include, but without limitation, bituminous substances such as the pitches and resins, gums, waxes, blown oils, and the like; and the fibers may include besides cotton, other vegetable fibers such as sulphite, groundwood, flax, and the like, or mineral fibers such as asbestos.

Compositions of asphalt and fibers are well known. Their properties vary widely with the proportions of ingredients, the physical characteristics of the binder, the kind and fiber-length of the fibrous material, and the manner of association of the two. Super-added materials such as fillers also have a major effect upon the compositions. These may comprise diatomaceous earths, clay, slate, dust and the like.

In general such compositions are made by mechanically associating fibers and asphalt when the latter is either in a liquid condition, or in a condition of adhesive and extensible guminess. With a hard asphalt a high temperature must be employed to bring about the desired characteristics, and the resultant product must be moulded into a useful article also at such an elevated temperature as will insure the desired plasticity. With binders of less hardness, of course, lower temperatures may be employed. There are binders of such hardness, however, that the temperatures necessary in some processes are high enough to char organic fibers, or bring about other undesirable changes in the composition.

Attempts have been made to produce compositions by comminuting a hard binder, and mixing it cold and powdered with a fiber, afterwards moulding under heat and pressure. Such attempts seem not to have attained any commercial success. In some processes the binder has been cut with a solvent so as to permit the use of lower temperatures, or for other purposes. These processes, except for specialized uses, are expensive and cumbersome; a solvent-softened asphalt is not the same as a heat-softened asphalt, and there is the problem of the removal from the binder at some stage of the process of a considerable quantity by volume of a solvent.

Attempts have also been made to attain compositions in which the plasticity or workability was water-controlled, by emulsifying asphalt, for example, with colloidal clay, and mixing the binder in this form with a fibrous pulp. Here, then is a limit to the proportion of the binder that can be provided.

I have discovered that it is possible to work an asphaltic or other composition of fiber and water-immiscible binder in the presence of water in such a way as to make a mechanical suspension which is useful in the arts. The manner of the preliminary association of the fibers and the bitumen does not seem to be controlling to my present invention. In a copending case, Serial No. 314,551, filed Oct. 23, 1928, I have described a precedure which results in the formation of a true pulp in which fibers and bitumen are in association. The procedure of this present disclosure may under specialized circumstances result in or assist in the production of such a pulp; but it does not even preferably do so, and its application is primarily to a wide range of procedures in which the formation of such a pulp is precluded by conditions which are immaterial to the practice of my invention as set forth herein.

I may take of an asphalt, having a Ball and Ring softening point of 240° F., a penetration at 77/100/5 of 0, and at 150/100/5 of 11, fifty parts by weight. The characteristics and proportions of ingredients given herein are exemplary and not limiting. To this, I may add in a W. P. mixer, when the temperature of the asphalt is such as to bring it into a condition of adhesiveness and extensibility below the liquid range, fifteen parts of cotton linters. Upon the revolution of the mixer blades, the asphalt in the condition described adheres to the fibrous masses, and as the contents of the mixer are repeatedly worked and extended, the fibrous masses are broken down into individual fibers, and these fibers are homogeneously distributed throughout the binder and interlaced and refelted together therein giving a plastic composition suitable for moulding. Filler materials may be used, if desired, and in the formula set forth may be included, say, thirty-five parts of diatomaceous earth, making one hundred parts in all.

A second exemplary formula may comprise 50% of "Stanolite" asphalt having a Ball and Ring softening point of 145° F. and a penetration at 77/100/5 of 10, 15% and 35% cotton linters.

The mixing method described is not a limitation on my present invention. Other methods may be practiced. Thus the bitumen may be liquefied by heat, and the fibrous matter and filler merely stirred in by the mixer blades. When this is done, an uneven fiber distribution, and a product of somewhat less desirability for certain uses will result.

When the mixing has been carried on to the desired extent,—it should be sufficient to bring the fibers and the asphalt into intimate association, and will usually be carried on to completion as for a moulding compound,—I add to my mixer a great excess of water, and continue the revolution of the blades. It will be quite obvious that the conditions in the mixer should not be such as will preclude the maintenance therein of a large excess of water, even though considerable additions must be made from time to time. It will be found satisfactory to break down the first exemplary mix at 200° F., and the second at 80° F. The presence of the water will of course tend to cool the mixer and contents to around the boiling point of water; but this step of my process may be carried on below the boiling point of water,—how much below depending on the binder,—and is advantageously so carried on, so long as there is sufficient plasticity in the compound to relieve the mixer blades of too great a strain. As the mixing action continues, the mass of composition is gradually broken down and brought into a state of finer and finer subdivision. At first it will tend to break apart in large masses; these in turn will be broken apart, and the disintegration can be continued until there is produced a suspension of whatever fineness is desired. The action is possible because there seems to be no substantial tendency toward the recoalescence of the masses, due, I think to the presence of a film of water over their surfaces. The final product is a granular mass of more or less fineness as may be desired. It is not substantially sticky to the touch, when fine in character, it can be stored as a stiffly plastic mud or a granular material moist to the touch and will remain indefinitely ready for use as long as moisture is present. After its formation, excess water may be removed; but so long as sufficient water remains to coat the surfaces of the particles going to make up the mass, its plastic condition will be preserved.

It is possible to follow my invention by bringing about in the mixer a partial disintegration, and then transferring the mass to some other type of machine for further mechanical work.

Thus, I may transfer it to a beating engine of ordinary paper mill type, and, manipulating the blades, grind, rather than beat, the stock to a fine state of subdivision. Excepting in specialized cases, as hereinabove indicated, where other factors are controlling, I do not however, get a true pulp. The fibrous asphalt breaks down gradually and homogeneously, so far as volume composition goes, so that the final product will comprise masses of fibrous asphalt as such, though there may be a proportion of individualized and coated fibers. Further mechanical work will tend to disintegrate the fibrous asphalt just as it would any homogeneous solid, the fiber length being shortened by the action to some degree, as distinguished from the action of beating out the fibers in the ordinary pulp making process.

While primarily useful in connection with compositions in which the proportion of fiber to asphalt is such as to give a plastic dough when mixed in the ordinary manner, my process may be used with compositions in which there is so much fiber and filler in relation to binder that the result of the preliminary mix is a friable, granular mass.

The breaking down action which occurs under mechanical work in the presence of water is not easy of explanation. It apparently depends upon the association of the binder and the fiber. It is not possible to gain a satisfactory result with asphalt alone, but when a composition of asphalt and fibers is made and treated as described, it can be broken down into my product. It is possible that the fibrous material gives a body to the asphalt which facilitates the mechanical work of dispersion. I have no reason to believe that my product in its broadest sense shows any characteristics of dispersion other than mechanical; but it is certain that the dispersion cannot be obtained excepting in the presence of fibrous material.

The breaking down operation can, of course, be conducted in the presence of other materials than those described. Water alone is satisfactory, and generally preferable; but water and other substances may be used, or other vehicles than water, or solutions of other substances in water. As might be expected, the addition of a substance to the water which increases its surface tension is not per se harmful, and may in certain circumstances be useful. But it is the purpose and the great advantage of my invention to avoid the use of super-added substances, particularly such as would tend to destroy the pre-formed relationship of the fibers and the binder. It has appeared in experimental work on my invention that it is advisable that this preliminary relationship be not disturbed, and that the disturbance of it will tend in greater or less measure to give me some other kind of a product than that which I intend to cover in this application. Thus the addition of a solvent for asphalt to the water or the use of a solvent as the liquid vehicle, may in the first case hamper, and in the second case utterly preclude the practice of my invention. In fact, the addition of an asphalt solvent to the water may produce an emulsion of solvent-dissolved asphalt in water, accompanied by the liberation of the fibers and filler.

Solid substances added to the composition in the mixer or present during the disintegration step are not in general harmful. They, also, should not be such as to destroy the fundamental preformed relationship of the binder and asphalt, nor on the other hand should they be present in such quantity as to injuriously affect the nature of the bonding qualities of the resultant product. A colloidal clay, as an example, may do both. One substance which may advantageously be added for certain uses is a fibrous material. Additional fiber appears to facilitate the breaking down action, and appears to give an improved product under certain conditions. Its presence as an ingredient in the final product must, of course, be taken into account, but where the quantity of binder is large in relation to the total fiber and filler quantity, a satisfactory bonding may be obtained when the product has been dried.

My product is a stable mass comprising fibrous asphalt in mechanical association with water. It can be given many characteristics. It may be fitted for moulding under pressure, as an ingredient in a felting operation, or as a plastic cement for trowelling or the like. It is stable so long as the water or other vehicle is not dried out of it. It should be pointed out here that it differs from a mass cut with solvent in this, that to keep my compound in soft form only sufficient water is needed as will maintain the surface phase relationship, whereas in a solvent mix the quantity of solvent is relatively very large by volume. Thus there is not the same tendency for my compound to contract upon hardening. Articles may be formed by moulding my product under heat and pressure in a mould, or it may be otherwise formed as desired, and dried. With soft binders a substantial fusion and recoalescence usually occur at ordinary temperatures of drying, but it may be hastened at any temperature expedient or consistent with the materials used. When the product is moulded under pressure, the pressure assists the interfusion of the mass rendering a less degree of heat necessary. An article moulded of my product is characterized by substantial homogeneity, since there is no resident film of anything about the original particles through which interfusion can take place only imperfectly.

As indicated, my invention is not restricted to specific ingredients or proportions, and may be modified as regards these matters, the qualities of the preliminary or final composition, and the mechanical mixing employed. Having thus described my invention, what I claim as new and desire to secure by Letters Patent, is:—

1. That process of making a plastic mass which comprises mixing fibers and bitumen whereby said fibers become coated with bitumen, and dispersing the binder-coated fibers in water by subdivision by mechanical means, without alleviating the bituminous coating of said fibers.

2. That process of producing a plastic mass which comprises mixing a binder substance with a fibrous material to the extent of completely coating said fibers with binder, and mechanically dispersing by merely subdividing the mass so formed in a liquid vehicle immiscible with said binder, while said binder is heated above its solid stage without substantial alleviation of the fibers from the binder.

3. That process of producing a plastic mass, which comprises introducing a binder and a fibrous material into a mixer, mixing said substances to the extent of forming a plastic mass in which the fibers are coated, adding thereto an excess of a liquid vehicle immiscible with said binder, and continuing said mixing until a mechanical dispersion is formed, consisting of uncoated bodily comminuted portions of said plastic mass of binder-coated fibers.

4. That process of producing a plastic mass which comprises introducing a bitumen and a fiber into a mixer, mixing said substances to the extent of forming a plastic mass in which the fibers are coated, adding thereto an excess of water, and continuing said mixing until a mechanical dispersion is formed, consisting of uncoated bodily comminuted portions of said plastic mass of bitumen-coated fibers.

5. That process of producing a plastic mass, which comprises introducing a binder, fibrous material and non-fibrous filler into a mixer, mixing said substances to the extent of forming a plastic mass in which the fibers are coated, adding thereto an excess of a liquid vehicle immiscible with said binder, and continuing said mixing until a mechanical dispersion is formed, consisting of uncoated bodily comminuted portions of said plastic mass of binder-coated fibers.

6. That process of producing a plastic mass which comprises introducing a binder, fibrous material and non-fibrous filler into a mixer, mixing said substances to the extent of forming a mass in which the fibers are completely coated, adding thereto an excess of water, and continuing said mixing until a mechanical dispersion is formed, consisting of uncoated, bodily comminuted portions of said mass of binder-coated fibers.

7. That process of producing a plastic mass which comprises introducing a bitumen and a fiber into a mixer, distributing said fiber throughout said bitumen and completely coating the same, adding an excess of water, and while said bitumen is above the solid state in temperature, continuing the mixing to the extent of disintegrating the mass into small particles in water suspension, in which said fiber remains coated with bitumen.

8. That process of producing a plastic mass which comprises introducing a bitumen and a fiber into a mixer, distributing said fiber throughout said bitumen and completely coating the same, adding an excess of water and further fiber to said mixer, and continuing the mixing to the extent of bodily disintegrating the mass into small particles in water suspension without altering the relationship of ingredients of said mass.

9. That process of making a fibrous composition which comprises bringing fibers and a plastic binder into intimate association devoid of any substantial alleviation of the fibers from the binder, and then, by mechanical non-emulsifying action, in the presence of and with the aid of a proportionately great excess of liquid immiscible with the binder, comminuting the intimately associated fibers and binder without materially decreasing their intimacy of association.

10. That process of making a fibrous composition which comprises bringing fibers and a bituminous plastic into intimate association devoid of any substantial alleviation of the fibers from the bituminous plastic, and then, by a mechanical non-emulsifying action, in the presence of and with the aid of a proportionately great excess of liquid immiscible with the bituminous plastic, comminuting the intimately associated fibers and binder without materially decreasing their intimacy of association.

11. That process of making a fibrous composition which comprises bringing fibers and a plastic binder immiscible with water, into intimate association devoid of any substantial alleviation of the fibers from the binder, and then, by mechanical non-emulsifying action, in the presence of and with the aid of a proportionately great excess of water, comminuting the intimately associated fibers and binder without materially decreasing their intimacy of association.

12. That process of making a fibrous composition which comprises bringing fibers and a bituminous plastic into intimate association devoid of any substantial alleviation of the fibers from the bituminous plastic, and then by a mechanical non-emulsifying action, in the presence of and with the aid of a proportionately great excess of water, comminuting the intimately associated fibers and binder without materially decreasing their intimacy of association.

HARRY C. FISHER.